US007675855B2

(12) United States Patent
Storry et al.

(10) Patent No.: US 7,675,855 B2
(45) Date of Patent: Mar. 9, 2010

(54) SYSTEM AND METHOD FOR PROVIDING TRAFFIC FLOW CONTROL IN A COMMUNICATION NETWORK (75) Inventors: Charles Michael Storry, Kemptville (CA); Stephen Haldane Wellington, Ottawa (CA); Francis Frederick Budd, Kanata (CA)

(73) Assignee: Alcatel Lucent, Paris (FR)

( * ) Notice: Subject to any disclaimer, the term of this patent is extended or adjusted under 35 U.S.C. 154(b) by 1407 days.

(21) Appl. No.: 10/348,912

(22) Filed: Jan. 23, 2003

(65) Prior Publication Data

US 2003/0218979 A1    Nov. 27, 2003

(30) Foreign Application Priority Data

May 24, 2002  (CA)  ................................... 2387654

(51) Int. Cl.
H04L 12/26  (2006.01)
(52) U.S. Cl. ....................................... 370/233; 370/235
(58) Field of Classification Search ...... 370/229–236.2, 370/420
See application file for complete search history.

(56) References Cited

U.S. PATENT DOCUMENTS

| 5,748,613 | A | | 5/1998 | Kilk et al. | |
| 6,128,303 | A | * | 10/2000 | Bergantino et al. | 370/398 |
| 6,229,812 | B1 | * | 5/2001 | Parruck et al. | 370/412 |
| 6,646,985 | B1 | * | 11/2003 | Park et al. | 370/229 |
| 7,068,602 | B2 | * | 6/2006 | Davari et al. | 370/232 |
| 2001/0001608 | A1 | * | 5/2001 | Parruck et al. | 370/232 |
| 2001/0053127 | A1 | * | 12/2001 | Horioka et al. | 370/232 |
| 2002/0004842 | A1 | | 1/2002 | Ghose et al. | |
| 2002/0012354 | A1 | * | 1/2002 | Czerwiec et al. | 370/420 |
| 2002/0012359 | A1 | * | 1/2002 | Kikuchi et al. | 370/468 |
| 2002/0064221 | A1 | * | 5/2002 | Yeap et al. | 375/222 |
| 2002/0075802 | A1 | * | 6/2002 | Sugama et al. | 370/230.1 |
| 2002/0085587 | A1 | | 7/2002 | Mascolo | |

FOREIGN PATENT DOCUMENTS

| EP | 0 852 445 A | 7/1998 |
| EP | 0 959 590 A | 11/1999 |
| EP | 0 986 217 A | 3/2000 |
| EP | 1 365 541 A | 11/2003 |

OTHER PUBLICATIONS

"Utopia Level 4", ATM Forum Technical Committee, Mar. 2000, p. 20, paragraph 7- p. 25, paragraph 9; figures 8-16.
Bonomi et al: "The Rate-Based Flow Control Framework for the Available Bit Rate ATM Service", IEEE Network, IEEE Inc., New York, vol. 9, No. 2, Mar./Apr. 1995.

* cited by examiner

Primary Examiner—Kwang B Yao
Assistant Examiner—Andrew Lai
(74) Attorney, Agent, or Firm—Kramer & Amado, PC (57) ABSTRACT The present invention provides a system and method for establishing a data transmission rate in a communication network for data transmission from a first communication module to a second communication module. Generally, the method comprises: (a) reading at the first module a predetermined data reception rate limit of the second module; and (b) for the data at the first module to be transmitted to the second module, establishing a first module data transmission rate in dependence upon the predetermined data reception rate limit read in step (a).

11 Claims, 5 Drawing Sheets

SYSTEM AND METHOD FOR PROVIDING TRAFFIC FLOW CONTROL IN A COMMUNICATION NETWORK

FIELD OF THE INVENTION

The present invention relates generally to the field of communication networks and more particularly, to a system and method for controlling traffic flow directed to a remote node or device.

By way of example, the present invention may suitably be deployed in the wireline transmission of broadband network traffic from a distribution backbone network such as a trunk network to an access network such as a local loop having one or more access terminals. In the given example, a remote network unit according to one embodiment of the present invention may be utilized to interface with the local loop located downstream of the distribution backbone network. A distribution network unit according to another embodiment of the present invention may be utilized to interface with the distribution backbone network. The remote network unit may be operatively connected to the distribution network unit by way of a high-capacity transmission link, for instance one supporting an aggregate data throughput of the order of 1 or 2 Gbps or more. A system and method in accordance with an embodiment of the present invention may be used to control the rate of traffic flow directed from the distribution network unit to the plurality of access terminals on the access network connected to the remote network unit.

BACKGROUND OF THE INVENTION

It is said that whether in terms of distance covered, number of endpoints generated or value invested, the most predominant transmission medium for communication networks worldwide is that of copper. This has resulted from the use of copper as a transmission medium in the earliest of large scale telephony networks. Although copper has now largely been superseded in trunk or distribution networks by the use of optical fibre, many access networks, such as the local loops of public switched telephone networks, continue to employ copper. Globally, it is estimated that many tens of millions of tons of copper are deployed in such access networks and that this transmission medium may account for roughly one-half or more of the assets of the typical network operator.

As a transmission or delivery medium in modern communication networks, copper presents the challenge that it provides a theoretical maximum information rate of only approximately 35 kbps to 56 kbps across public switched telephone networks. Many technologies have emerged to extract higher bandwidth data transmissions from the existing copper based networks, due to a market demand for the delivery on such networks of higher bandwidth applications such as digital video and high-speed Internet access. For instance, a number of digital subscriber line or loop (DSL) architectures have been introduced in the last decade, each providing differing combinations of upstream data rates, downstream data rates and ranges of operation. Collectively, this family of digital subscriber line architectures is sometimes referred to as xDSL and will be so referred to in this specification to denote all such digital subscriber line architectures.

The various xDSL architectures as introduced above cannot typically operate in ranges which exceed a few kilometers. For example, in high-speed digital subscriber loop (HDSL) technologies, data rates in the neighbourhood of 2 Mbps can be achieved by combining the capacity of two or three pairs. However, this is sustainable only over a distance of approximately 3 km. Using very high rate digital subscriber loop (VDSL) techniques, data rates as high as 23 Mbps in the downstream direction and 3 Mbps in the upstream direction can be attained, but only for distances in the neighbourhood of one kilometer at such rates.

In the context of telephony networks, various prior art solutions for controlling network traffic from the central office ("CO") to the remote access terminals have been proposed.

One prior art solution for traffic flow management provides an "end-to-end" flow control implemented between the CO and the remote access terminals connected to an access network. In this prior art system, traffic flow control signals are passed between the remote access terminal and the CO in order to effect back pressure as necessary to moderate the traffic flow being directed to the remote access terminal down to a rate suitable for the remote terminal's established train rate, i.e. transmission rate. However, in such an end-to-end flow control system, the latency associated with passing control signals over a potential distance of many kilometers between the remote user terminal and the CO may be a significant problem.

There is therefore a need for an approach to controlling traffic flow directed to a remote node or device which intends to avoid some of the drawbacks identified above for prior art systems and methods.

SUMMARY OF THE INVENTION

In an aspect of the invention, a method of establishing a data transmission rate in a communication network for transmission of data from a first communication module to a second communication module is provided. The method comprises associating at the first module a predetermined limit for data transmissions of the second module and for the data at the first module to be transmitted to the second module, establishing a first module data transmission rate in dependence upon the predetermined limit.

In the method in step (b), the first module data transmission rate may be established to enable the second communication module to transmit data therefrom within the predetermined rate limit.

In the method, in step (a) the predetermined data may be a value stored in a memory associated with the first module.

In the method, prior to step (a), the method may further comprise providing from the second module to the first module the predetermined data rate limit and storing the predetermined data rate limit in the memory.

In the method, the first module may be configured to receive from a data distribution network data directed to the second module. Further, the first module may include, at an interface to the data distribution network, a data buffer for buffering the data directed to the second module.

In the method, the first module data transmission rate may be a rate at which data directed to the second module is extracted by a traffic shaping unit from the data buffer.

In the method, the first module may be upstream of the second module.

In the method, the predetermined limit may be updated periodically.

In the method, the communication network may be a telephony network, the first module may comprise a distribution network unit in a central office (CO), and the second module may comprise a digital subscriber link (DSL) terminal.

In a second aspect, a system for establishing a data transmission rate in a communication network for data transmission from a first communication module to a second communication module is provided. The system comprises a storage device for storing a predetermined rate limit for transmission of data by the second module. The storage device is associated with the first module. The system further comprises a traffic shaping unit at the first module for establishing a first module data transmission rate in dependence upon the predetermined limit to enable the second communication module to transmit data therefrom within the predetermined rate limit.

The system may further comprise a second storage element associated with the second module for storing the predetermined rate limit and a communication module in the second module to extract the predetermined rate limit from the second storage element and transmit the predetermined rate limit to the first module.

The system may have the first module configured to receive from a data distribution network data directed to the second module. Further, the first module may include, at an interface to the data distribution network, a data buffer for buffering the data directed to the second module.

The system may have the data transmission rate being the rate at which the data directed to the second module is extracted from the data buffer by the traffic shaping unit.

The system may have the data buffer at the interface being a FIFO queue. Further, the system may have the traffic shaping unit configured to back pressure at the FIFO queue any flow of data directed to the second module which exceeds the data transmission rate established by the traffic shaping unit.

In the system, the communication network may be a telephony network, the first module may comprise a distribution network unit in a central office (CO) and the second module may comprise a digital subscriber link (DSL) terminal.

In the system, the predetermined data reception rate for the second module may comprise a train rate established for the DSL terminal.

The system may further comprise a remote network unit located between the distribution network unit and the DSL terminal that extends the architecture of the CO by means of a high-capacity transmission link provided between the remote network unit and the distribution network unit.

In other aspects of the invention, various combinations and subset of the above aspects are provided.

BRIEF DESCRIPTION OF THE DRAWINGS

By way of illustration and not of limitation, embodiments of the present invention are next described with reference to the following drawings, in which.

DETAILED DESCRIPTION OF ILLUSTRATIVE EMBODIMENTS

As noted, the present invention relates generally to a system and method for providing control for traffic flow directed to a remote node or device. More specifically, the traffic flow control system and method of the present invention is suitable for deployment in a telephony network, for example, to control traffic flow from a distribution network unit located in a CO to a plurality of access terminals on a remote access network. As will be explained below, the traffic control system and method of the present invention reduces or avoids potential latency problems associated with prior art traffic flow control systems and methods by managing traffic flow control locally at the source of the traffic flow, rather than remotely at the traffic flow destination. This locally managed traffic flow control is based on knowledge of the data train rate of each remote access terminal or device. As will be further explained in accordance with the present invention, local traffic flow control signals are generated and used to control transmission rates of traffic sent from the distribution unit to a remote access terminal such that the traffic transmitted at rates within transmission limitations present at the remote access terminal. A benefit of this system is that it has the intent of reducing backpressing of transmissions from the remote access terminal to the distribution unit.

A traffic flow control system and method in accordance with an illustrative embodiment of the present invention is now described. For the purposes of illustration, reference is made to an exemplary telephony network topology in which a distribution network unit located in a CO is connected to one or more remote network units, each connecting a plurality of remote user terminals on a local loop access network.

Figure 1:
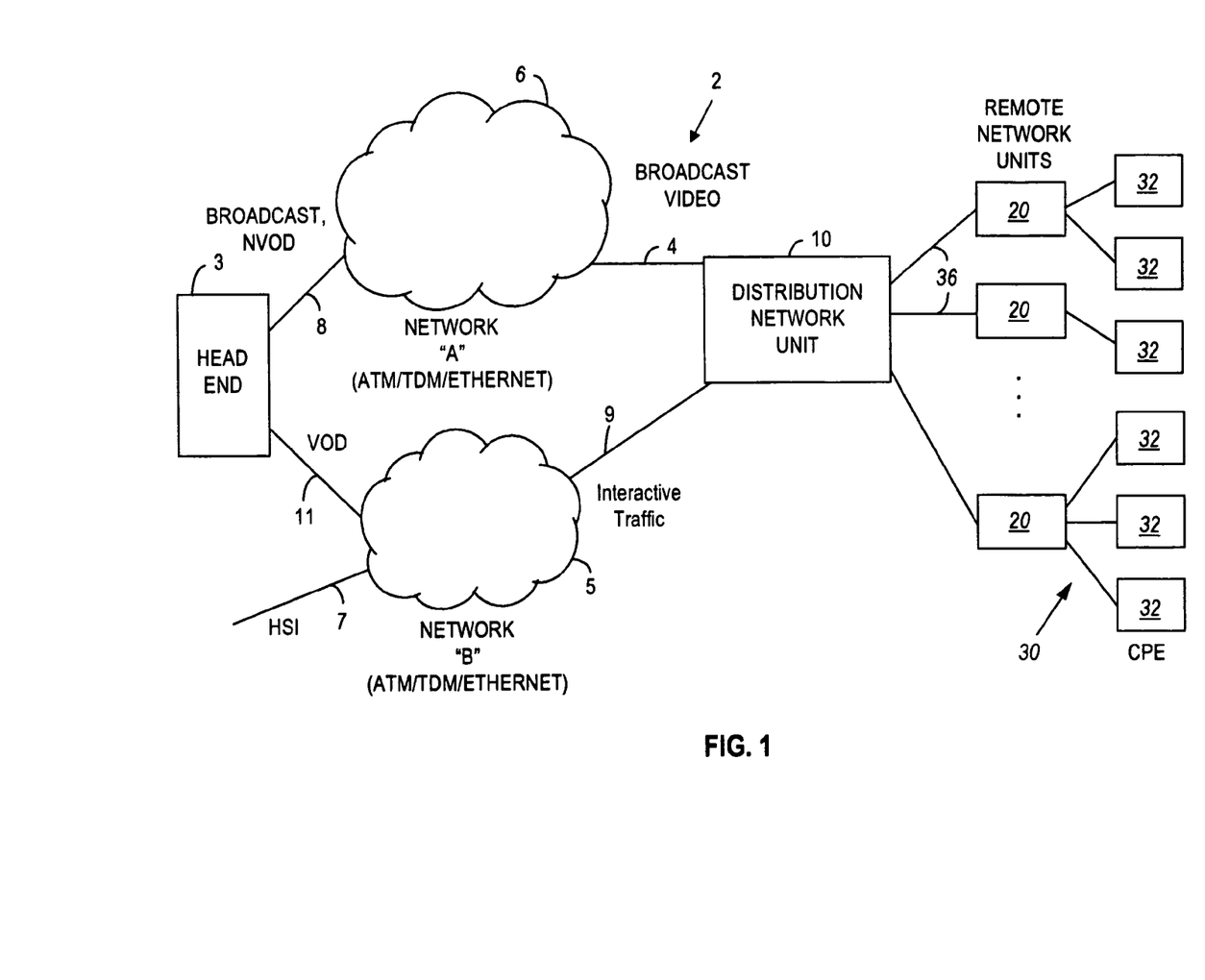
FIG. 1 is an exemplary network topology in which a distribution network unit and a remote network unit are deployed according to embodiments of the present invention.

Specifically, FIG. 1 shows an example of a network topology 2 comprising a distribution network and an access network in which a distribution network unit 10 and a corresponding remote network unit 20 are deployed. The network topology 2 may provide various forms of traffic destined for an access network via the distribution network unit 10, with such traffic having differing requirements as to bandwidth or class of transmission service. Broadcast video traffic 4 and interactive traffic 9 constitute the broadband network traffic and are provided to distribution network 10 via the distribution backbone which includes the distribution networks 5 and 6 although networks 5 and 6 may be combined as will be obvious to those skilled in the art. For instance, broadcast video traffic may be delivered to the distribution network unit 10 by way of an OC-12 interface 4 or the like, from a suitable distribution network 6 (also labelled Network "A") such as one employing asynchronous transfer mode (ATM), time division multiplexing (TDM), Ethernet or other suitable communication protocols. Broadcast video traffic may comprise such services as those pertaining to broadcast TV or near video on demand (NVoD), as transmitted via link 8 from head end 3. Interactive traffic may also be delivered to the distribution network unit 10, for instance by way of an OC-3 interface 9 or the like from a distribution network 5 (also labelled Network "B") to which various forms of such traffic may initially be directed. For instance, from the head end 3 the distribution network 5 may receive traffic over link 11 which supports services in the nature of video on demand (VoD). The distribution network 5 may also receive high-speed Internet (HSI) traffic over link 7, for instance from a backbone network (not shown). Many other suitable network topologies will be apparent to those skilled in this art for the provision or delivery of traffic to or from an access network as aforesaid.

A plurality of remote network units 20, as described more fully below, may operatively be connected to the distribution network unit 10. Each remote network unit 20 is connected to an access network, such as the local copper loop 30. The local copper loop 30 itself connects to customer premises equipment which may be in the form of one or more user terminals 32. Each remote network unit 20 is connected to its corresponding distribution network unit 10 by means of a high-capacity transmission link 36, in other words one having a capacity greater than that associated with the access network. For instance, transmission link 36 may be an aggregate fibre link capable of supporting an aggregate data throughput of the order of 1 or 2 Gbps. Any other appropriate link as known to those in this art may be deployed as transmission link 36, for instance a wireless link, a link based on passive optical networking (PON) technology or the like.

Figure 2:
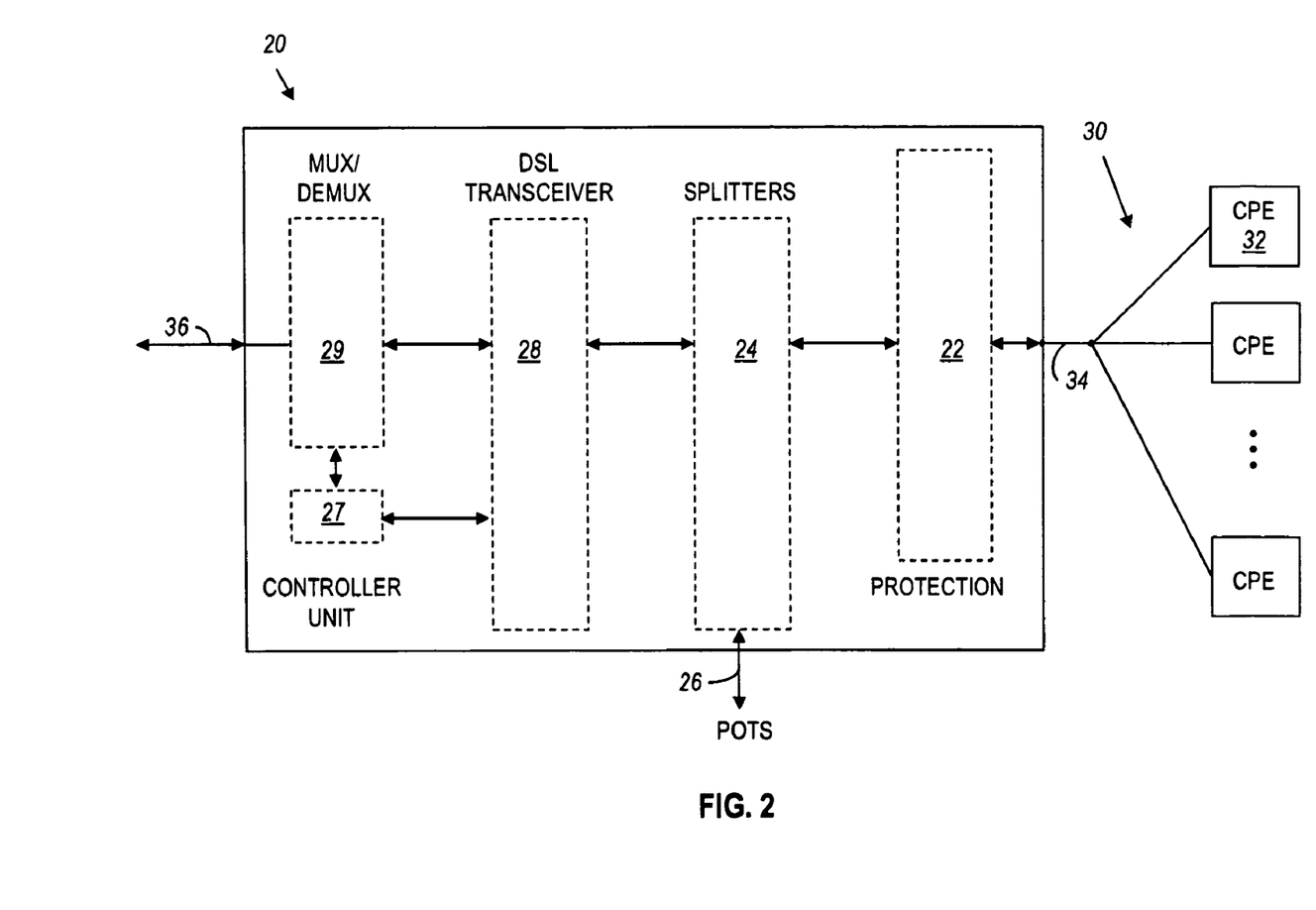
FIG. 2 is a block diagram depicting a high-level architecture of the remote network unit according to FIG. 1.

FIG. 2 depicts the block architecture of the remote network unit 20 according to an embodiment of the present invention. This block architecture is described immediately below, proceeding from the downstream terminal end of the access network to the upstream egress end of the remote network unit 20. However, those skilled in this art will appreciate that traffic flow in and through the remote network unit 20 is bidirectional in nature, insofar as interactive traffic is concerned.

The expression "downstream" is employed herein for ease of reference to refer to traffic flow that is generally bound in the direction from the distribution networks 5 and 6 towards the remote user terminals 32. Conversely, the expression "upstream" is employed herein to refer to traffic flow that is generally bound in the direction from the remote user terminals 32 towards the distribution networks 5 and 6. Furthermore, the expression "loop-side" is employed herein in connection with components or modules that are considered to be more proximate to the copper loop 30 when compared to the transmission link 36 located in the upstream direction thereto. Conversely, the expression "distribution-side" is employed herein in connection with components or modules that are considered to be less proximate to the copper loop 30 than the transmission link 36.

At the downstream terminal end of an access network, such as the local copper loop 30, are located customer premises equipment which may be in the form of one or more user terminals 32. The local copper loop 30 from each of the user terminals 32 is connected to the remote network unit 20, as at 34. Although for purposes of illustration a single connection 34 has been depicted in FIG. 2, those skilled in this art will appreciate that each CPE 32 typically will be connected independently to the remote network unit 20. Where the lines of the local copper loop 30 would require primary protection blocks 22 as are known in this art, these may be provisioned in the remote network unit 20. Depending on the line technology with which the remote network unit 20 is to be deployed, splitters 24 may also be provisioned therein. Where the access network such as local copper loop 30 supports plain old telephone service (POTS), the splitters 24 cause a separation of the conventional POTS telephone service traffic from data services traffic received thereover by remote network unit 20. The POTS telephone service traffic is channeled as at 26 to a corresponding POTS network without further processing by the remote network unit 20. Similarly, where an integrated services digital network (ISDN) is deployed in the access network, splitters 24 may likewise channel ISDN traffic to avoid further processing thereof by the remote network unit 20.

Data services traffic, for instance in the form of xDSL data, may proceed from the splitters 24 to a processing block which, in the case of xDSL data, is provisioned in the form of one or more xDSL transceivers 28 well known to the notional person skilled in the field of communications. Each xDSL transceiver 28 includes associated xDSL chipsets, line drivers and other external circuitry (not shown) required to implement the supported xDSL service, all as appreciated by those skilled in this art. By way of example, one or more xDSL transceivers 28 may support ninety-six (96) user data ports (not shown) such as ADSL ports running on POTS lines. Also as known to those versed in this art, each xDSL transceiver 28 will typically contain management interfaces (not shown) to provide configuration, alarm and statistics collection capabilities. Such management interfaces of each xDSL transceiver 28 may be controlled locally or remotely, for instance respectively by way of known in-band or out-of-band techniques. For in-band control, the DSL chipsets of an xDSL transceiver 28 are typically configured from a remote processor via direct addressing and without local processor intervention. In the case of out-of-band control, the aforesaid xDSL chipsets are usually configured using specific signaling between a remote processor and a local processor, resulting in control messages being directed to the xDSL chipset. The aforesaid management interfaces of each xDSL transceiver 28 may be accessed by means of a loop-side controller unit 27, which is described in greater detail below.

Figure 3:
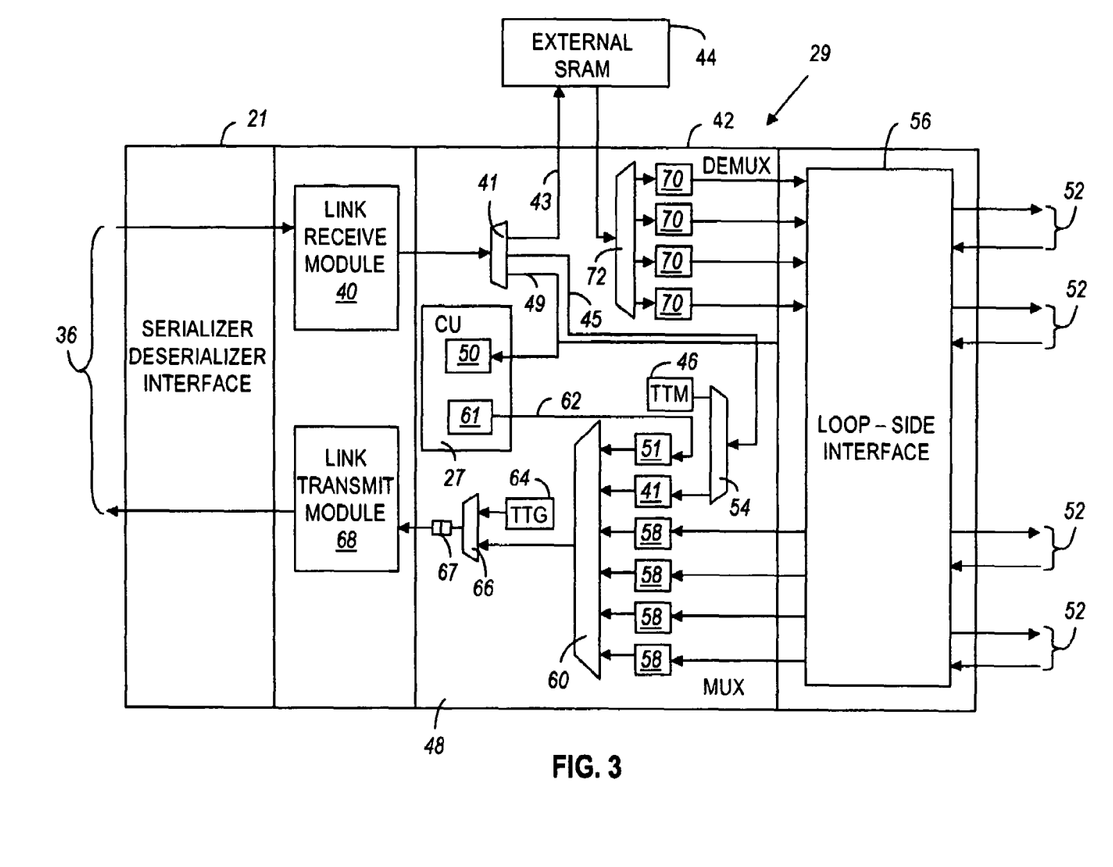
FIG. 3 is a block diagram illustrating architectural details of a loop-side multiplexer/demultiplexer unit and a loop-side controller unit according to embodiments of the present invention and forming part of the remote network unit of FIGS. 1 and 2.

Upstream from the xDSL transceivers 28, cells from individual xDSL ports are multiplexed in the loop-side multiplexer/demultiplexer unit 29, as explained in greater detail below. An appropriate link termination (not shown in FIG. 2), well known to those in this art, may be deployed between transmission link 36 and loop-side multiplexer/demultiplexer unit 29. An exemplary link termination is identified below as part of loop-side multiplexer/demultiplexer unit 29 (FIG. 3). The multiplexed cells are thereafter transmitted to the distribution network unit 10 via transmission link 36 as aforesaid. In the downstream direction, the loop-side multiplexer/demultiplexer unit 29 demultiplexes cells received over transmission link 36 from the distribution network unit 10. Such demultiplexed cells are thereafter transmitted to the xDSL transceivers 28 which, as described above, support individual xDSL ports.

According to an illustrative embodiment of the remote network unit 20, congestion or queuing points are not introduced into the traffic stream traversing therethrough, except for jitter buffering if desired. Rather, the aggregate capacity of transmission link 36 and the internal architecture of the remote network unit 20 are such that the full bandwidth capacity of all xDSL ports supported by xDSL transceivers 28 is met. Those skilled in the art will understand that the foregoing capacity considerations for transmission link 36 constitute a preferred implementation, such that the present invention may be provisioned with a downstream link capacity which may be less than that of the corresponding xDSL ports in question.

Architectural details of the loop-side multiplexer/demultiplexer unit 29 and the loop-side controller unit 27 are next described with reference to FIG. 3. The transmission link 36 may be connected from the distribution network unit 10 to the remote network unit 20 by means of a suitable interface for bidirectional data transfer, for instance a loop-side serializer-deserializer (SD) interface 21 such as the TLK1201 SERDES device commercially available from Texas Instruments Incorporated of Dallas, Tex., U.S.A, operatively coupled to a suitable optical interface module. Using this bidirectional interface configuration will preferably permit transmission link 36 to operate with 8B/10B encoded data at 1.25 Gbps in each direction between the distribution network unit 10 and the remote network unit 20. Those skilled in this art will appreciate that any other appropriate interface may be provisioned for use with an embodiment of the present invention, and that transmission link 36 may comprise a single bidirectional link or multiple unidirectional links as may be desired.

Cell data received as individual bytes in the downstream bound direction from the transmission link 36 and over the loop-side serializer-deserializer interface 21 of the remote network unit 20 is processed by a loop-side link receive module 40. Although traffic in the form of cell data which are received as individual bytes is what is being contemplated by the illustrative embodiment herein, those versed in the art will understand that the invention is likewise applicable to packets, frames or any other information transfer units and that bit-wise reception of traffic may also be accommodated by the present invention. The loop-side link receive module 40 performs any necessary frame alignment functions and reconstructs cells following frame alignment from the individual bytes received by the loop-side serializer-deserializer interface 21. A port identifier associated with the cell data is also extracted by loop-side link receive module 40 for purposes of downstream cell routing, as described more fully below. Subsequent to cell reconstruction, appropriate error control as known in this art is performed by the loop-side link receive module 40 and any cells which are received with errors or which are idle are discarded. Non-errored and non-idled cells are thereafter transferred from the loop-side link receive module 40 to a loop-side demultiplexer module 42, which manages downstream cell flow for the remote network unit 20.

Preferably, the loop-side demultiplexer module 42 does not provide any back pressure indication to the loop-side serializer-deserializer interface 21. Rather, in the present illustrative embodiment, any necessary back pressuring of downstream traffic is performed on the "distribution-side" of the transmission link 36, at the distribution network unit 10. This requires the loop-side demultiplexer module 42 to be capable of accepting back-to-back cells transmitted at the full rate of the transmission link 36. As will be explained further below, in determining the amount of necessary back pressure, if any, to be applied locally at the distribution network unit 10, the train rate of each individual xDSL port connected to the remote network unit 20 is taken into account. In the present illustrative embodiment, the exact train rate information for each individual xDSL port may be obtained from an API (Application Programming Interface) or the like of the loop-side xDSL chipsets in the loop-side DSL transceiver 28 located on the remote network unit 20 (in other embodiments, the train rate information may otherwise be stored in any suitable memory or storage accessible to the distribution network unit 10). In operation, the train rate information for each individual xDSL port may be stored in the xDSL chipset, for example, when each individual xDSL port service is established. This train rate information for each individual xDSL port may then be transmitted upstream to the distribution network unit 10 via, for example, a dedicated communication channel such as an AAL5 (ATM Adaptation Layer type 5) communication channel as detailed further below. Further, subsequent updates and revisions may be made to the train rate information at periodic or non-periodic intervals, as may be necessary.

The loop-side demultiplexer module 42 routes received and reassembled downstreamcells that are transmitted from the loop-side link receive module 40. The cells are routed as at block 41 to one of a number of destinations, based on the port identifier extracted as previously described. For example, cells associated with a port identifier that may be used to characterize control cells are routed to the loop-side controller unit 27. Such control cells are preferably routed as at 49 to a control cell queue 50 associated with the loop-side controller unit 27. For instance, control cell queue 50 may be provisioned as first-in first-out (FIFO) registers. Where cells are associated with a port identifier which corresponds to a port identifier that may be used to characterize cells destined for monitoring or test purposes, such cells are routed as at 45 to a loop-side test traffic monitor 46 or the like, via block 54. The function of test traffic monitor 46 is described in additional detail below.

Downstream bound cells from loop-side link receive module 40 that are associated with a port identifier corresponding to user data cells may be written as at 43 respectively to one of a plurality of data cell queues 44, whereby each such queue in turn corresponds to an external user data port such as one of the previously mentioned ADSL ports of the remote network unit 20. The data cell queues 44 may be provisioned as first-in first-out (FIFO) registers in an external SRAM or the like. Cells are thereafter transferred from their respective data cell queues 44 to outgoing loop-side queues 70 via block 72. The outgoing loop-side queues 70 may be provisioned as first-in first-out (FIFO) registers. From such outgoing loop-side queues 70, the cells are forwarded to a suitable loop-side interface 56 such as one conforming to the UTOPIA (Universal Test & Operations PHY Interface for ATM) Level 2 Physical Layer Interface as known to those in this art and as described in ATM Forum Technical Committee publication af-phy-0039.000, version 1.0, dated June 1995. The latter publication is incorporated by reference herein.

In the downstream direction, the loop-side interface 56 transmits cells from the loop-side demultiplexer module 42 to the DSL transceivers 28. In the illustrative embodiment described above whereby the remote network unit 20 supports ninety-six (96) ADSL ports, such downstream cells may be transferred from the loop-side demultiplexer module 42 to DSL transceivers 28 via a loop-side interface 56 comprising four (4) bidirectional UTOPIA Level 2 compliant ports 52. Preferably, the outgoing loop-side queues 70 correspond in number to the number of ports 52 provided with the loop-side interface 56, such that in the example mentioned above, twenty-four (24) ADSL ports will be assigned to each of four (4) outgoing loop-side queues 70.

The cells from each of the data cell queues 44 of the loop-side demultiplexer module 42 may be serviced in the downstream direction for transfer to a corresponding outgoing loop-side queue 70 using a suitable servicing scheme such as one based on a work conserving round robin algorithm, as known to those in this art. The loop-side demultiplexer module 42 also preferably serves to poll each external user data port of the remote network unit 20, such as the previously mentioned ADSL ports. The results of such polling by the remote network unit 20 are utilized to indicate a back pressure condition for each external user data port, as understood by those persons skilled in this art. For instance, a back pressure indication for a particular external user data port may be lifted where a cell destined for that same port has been transferred from an appropriate outgoing loop-side queue 70 to the loop-side interface 56. Likewise and by way of example, a back pressure indication for a particular external user data port may be activated upon selection of that same port for cell transfer from the associated data cell queue 44 to the appropriate outgoing loop-side queue 70. Where a particular external user data port is under a back pressure condition, the associated data cell queue 44 for that same port will not be serviced as aforesaid for transfer to a corresponding outgoing loop-side queue 70. (The back pressure indication per data port described here is not to be confused with the distribution-side back pressuring occurring at the distribution network unit 10 in accordance with the present invention. Rather, what is described in the immediately preceding paragraph is how the local downstream per port FIFOs are serviced at the remote network unit 20 to control traffic flow.)

The loop-side multiplexer/demultiplexer unit 29 may also serve to manage loopback traffic, as explained immediately below. Where a particular user data port is selected for loopback into the upstream bound traffic flow, then cells whose associated port identifier corresponds to the selected user data port will be routed as at 45 from the loop-side demultiplexer module 42 to the loop-side multiplexer module 48 for transmission in the upstream direction. The loopback cells in question may be received in a loopback cell queue 41 via block 54, and the loopback cell queue 41 may be provisioned as first-in first-out (FIFO) registers associated with the loop-side multiplexer module 48. The data cell queues 44 do not receive loopback cells as previously described. All other cells having port identifiers not as previously described may be dropped by the loop-side demultiplexer module 42 from the downstream bound traffic flow.

Upstream bound cells transmitted to the loop-side multiplexer/demultiplexer unit 29 from the DSL transceivers 28 may be received over loop-side interface 56. The upstream bound cells from loop-side interface 56 are forwarded to loop-side multiplexer module 48, which manages upstream cell flow for the remote network unit 20. The loop-side multiplexer module 48 polls the four (4) UTOPIA Level 2 compliant ports 52 mentioned above and may select from among these a particular port 52 pursuant to a desired cell servicing scheme, for instance one based upon a work-conservative binary round robin algorithm as known to those skilled in this art. Cells are transferred in this manner from each of the UTOPIA Level 2 compliant ports 52 to respective outgoing upstream queues 58, which may be provisioned as independent first-in first-out (FIFO) registers associated with the loop-side multiplexer module 48 and which are one-to-one mapped with the UTOPIA Level 2 compliant ports 52. The outgoing upstream queues 58 preferably provide backpressure information for purposes of polling as aforesaid of the ports 52.

Each of the outgoing loop-side queues 58 is itself serviced as at servicing block 60 together with loopback cell queue 41, previously described, and a loop-side control cell queue 51. The loop-side control cell queue 51 may for instance receive AAL5 control cells transmitted as at 62 from a cell generator 61 of the loop-side controller unit 27. Servicing block 60 preferably implements a work-conservative weighted round robin algorithm for selecting the particular upstream queue that is next to be serviced, whether one of the outgoing upstream queues 58, the loopback cell queue 41 or the control cell queue 51.

The loop-side multiplexer module 48 preferably comprises a loop-side test traffic generator 64 for upstream transmission of test cells. Where the loop-side test traffic generator 64 is deployed, an associated servicing block 66 can be utilized to implement a desired servicing scheme for the selection of cells proceeding from test traffic generator 64 and from servicing block 60, the latter being located upstream of servicing block 66 and more proximate to loop-side interface 56. The servicing scheme implemented by servicing block 66 is preferably one based on a work-conservative weighted round robin algorithm, as known to those in this art. As well, where a loop-side test traffic generator 64 is to form part of loop-side multiplexer module 48, servicing block 60 is preferably back-pressured whenever the test traffic generator 64 is enabled, so as to permit the insertion of upstream test traffic from loop-side test traffic generator 64 at a desired rate. It will be appreciated that the back pressuring at servicing block 60 is not related to the flow control system and method of the present invention. Rather, what is described in the immediately preceding paragraph is an internal back pressure mechanism which is used to control upstream traffic flow through multiplexer/demultiplexer 29.

Cells proceeding from servicing block 66 of the loop-side multiplexer module 48 are transferred to a loop-side link transmit module 68, preferably via a loop-side multiplexer output queue 67 which may be provisioned as first-in first-out (FIFO) registers. The loop-side link transmit module 68 performs header error control (HEC) checking and slot error control (SEC) insertion. As well, the loop-side link transmit module 68 generates an appropriate cell framing pattern and transmits data and idle cells to downstream serializer-deserializer interface 21 for transport onto transmission link 36.

As previously introduced, a loop-side test traffic monitor 46 preferably forms part of loop-side multiplexer module 48. When enabled, the loop-side test traffic monitor 46 functions to supervise any background test traffic. The monitored background test traffic is terminated at the loop-side test traffic monitor 46 and is not forwarded by the loop-side multiplexer module 48 in the direction of outgoing upstream queues 58. Preferably the loop-side test traffic monitor 46 does not provide back pressure indication to the loop-side demultiplexer module 42 from which test traffic cells are received. In other words, a flow control mechanism is preferably not implemented from the TTM 46. Rather, in accordance with the present invention, the downstream rate of traffic should not exceed the programmed rate for the loop back path at the remote network unit 20.

The loop-side multiplexer/demultiplexer unit 29 and loop-side controller unit 27 of the remote network unit 20 as previously described may together be implemented by means of a field programmable gate array or other suitable device, such as an ASIC, as known to those in this field of art.

Figure 4:
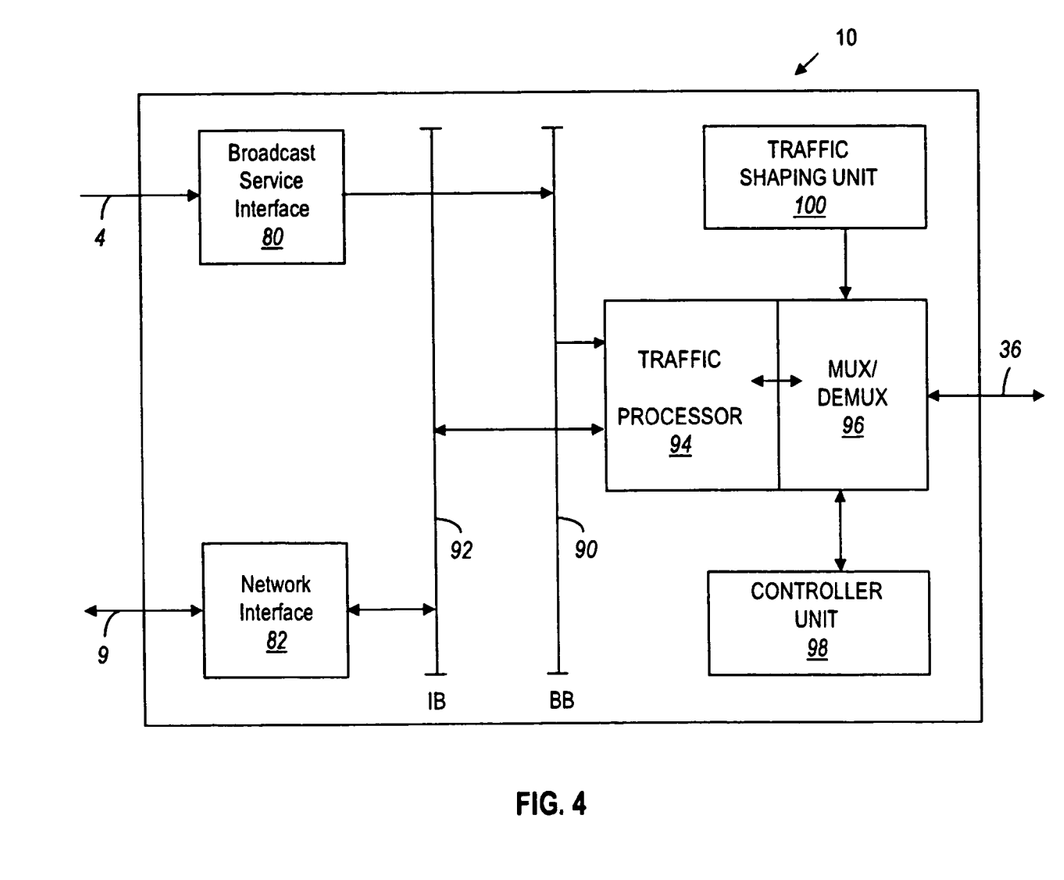
FIG. 4 is a block diagram depicting a high-level architecture of the distribution network unit according to FIG. 1.

With reference to FIG. 4, the block architecture of the distribution network unit 10 according to an embodiment of the present invention is next described. This block architecture is described immediately below, proceeding from the upstream interfaces 4 and 9 for the respective delivery of broadcast video traffic and interactive traffic, as previously described, and from those interfaces downstream to the transmission interface 36. However, those skilled in this art will appreciate that traffic flow in and through the distribution network unit 20 is bidirectional in nature, insofar as interactive traffic is concerned.

Broadcast video traffic transmitted over link 4 may be received by the distribution network unit 10 via a suitable broadcast service interface 80. The broadcast service interface 80 thus receives the broadcast video traffic and forwards same to a broadcast bus (BB) 90 or the like. Interactive traffic transmitted over link 9 may be received and transmitted by the distribution network unit 10 via a suitable network interface 82 as known to persons skilled in this art. In the downstream bound direction, the network interface 82 thus receives the interactive traffic over link 9 and forwards same to an interactive bus (IB) 92 or the like.

A traffic processor 94 may be utilized to merge traffic received in the downstream bound direction from each of the broadcast bus 90 and the interactive bus 92. For the illustrative embodiment of FIG. 1 where the distribution network unit 10 receives ATM traffic in the case of link 4 and both transmits and receives ATM traffic in the case of link 9, the traffic processor 94 will also perform ATM cell processing. For instance, and as understood by those skilled in this art, the traffic processor 94 will queue ATM cells received from the buses 90, 92. Such queuing is preferably performed on a per quality of service class basis and on a per user data port basis. In the case of the illustrative embodiment of FIG. 1, the user data ports may be ADSL ports as previously described. In the context of ATM traffic, the traffic processor 94 performs traffic scheduling according to quality of service and traffic contract considerations, as is well known to persons versed in this art. Header translation and VPI/VCI mapping, also as known to those in this art, are preferably performed by the traffic processor 94 in the case of ATM traffic, together with support for operation, administration and management (OAM) functions likewise well known to those skilled in the art. For multicast ATM traffic, the traffic processor 94 may additionally perform known cell replication functions. Preferably, the throughput capacity of the traffic processor 94 will be such that the latter will not constitute a congestion point within the distribution network unit 10 in view of the aggregate transfer rate supported by the transmission link 36.

Those skilled in this art will understand that the distribution network unit 10 may deploy more (not shown) than one traffic processor 94, for instance where the user data port handling capacity of a single such traffic processor 94 is exceeded by the aggregate number of user data ports being supported by the remote network unit 20. For instance, if in a particular implementation the traffic processor 94 is capable of handling twelve (12) user data ports, such as the previously mentioned ADSL ports of the illustrative embodiment of FIG. 1, then a total (not shown) of eight (8) traffic processors 94 will be deployed in the distribution network unit 10 to handle the aggregate number of ninety-six (96) ADSL ports of the remote network unit 20 according to the illustrative embodiment. Each traffic processor 94 may be provisioned in the form of an application-specific integrated circuit (ASIC) or the like (not shown).

The traffic processor 94 of distribution network unit 10 preferably interfaces with a distribution-side multiplexer/demultiplexer unit 96. A suitable distribution-side interface 124 (FIG. 5) such as a Utopia Level 2 compliant interface or the like, as previously introduced in the context of the remote network unit 20, may be employed to transmit cells between the traffic processor 94 and the distribution-side multiplexer/demultiplexer unit 96. As explained in greater detail below, the distribution-side multiplexer/demultiplexer unit 96 performs the tasks of receiving the merged traffic from the traffic processor 94 and of demultiplexing interactive traffic received over transmission link 36 for upstream bound transmission to the traffic processor 94.

A distribution-side controller unit 98, described additionally below, may be utilized in the network distribution unit 10 to handle such tasks as online and offline test support, monitoring and processing of maintenance messages and communication with the remote network unit 20 via the distribution-side multiplexer/demultiplexer unit 96 and the transmission link 36. As described in greater detail below, a traffic shaping unit 100 performs traffic scheduling in respect of the downstream bound cell flow from the distribution-side multiplexer/demultiplexer unit 96 over transmission link 36.

Figure 5:
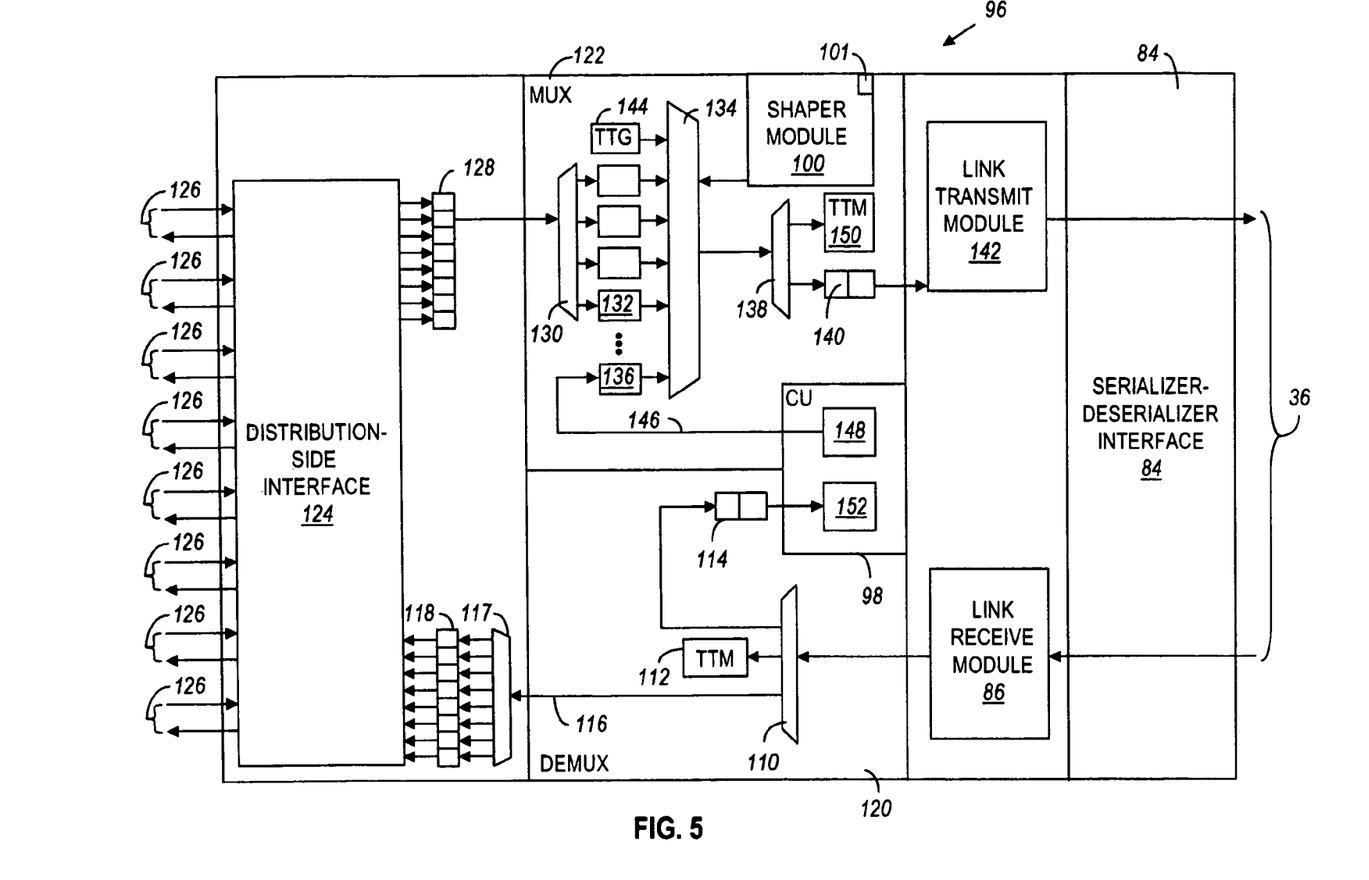
FIG. 5 is a block diagram illustrating architectural details of a distribution-side multiplexer/demultiplexer unit, distribution-side controller unit and traffic shaping unit according to embodiments of the present invention and forming part of the distribution network unit of FIGS. 1 and 4.

Architectural details of the distribution-side cell multiplexer/demultiplexer unit 96, the distribution-side controller unit 98 and the traffic shaping unit 100 are next described with reference to FIG. 5. As will be explained, in the present illustrative embodiment, the distribution-side cell multiplexer/demultiplexer unit 96, the distribution-side controller unit 98, and the traffic shaping unit 100 operate together to control downstream bound cell flow in accordance with the present invention.

The transmission link 36 from the remote network unit 20 may be connected to the distribution network unit 10 by means of a suitable interface for bidirectional data transfer. As explained above in relation to loop-side serializer-deserializer interface 21 of remote network unit 20, a distribution-side serializer-deserializer (SD) interface 84 such as the already described TLK1201 SERDES device, operatively coupled to a suitable optical interface module, may be used to connect the distribution network unit 10 with the remote network unit 20. The distribution-side serializer-deserializer interface 84 of the distribution network unit 10 performs the very same functions as previously described in the context of loop-side serializer-deserializer interface 21 of the remote network unit 20. As mentioned previously in relation to loop-side serializer-deserialized interface 21, other suitable devices for the distribution-side serializer-deserializer interface 84 will be known to those in this art.

Cell data received as individual bytes in the upstream bound direction from the transmission link 36 and over the distribution-side serializer-deserializer interface 84 of the distribution network unit 10 is processed by a distribution-side link receive module 86. The distribution-side link receive module 86 performs the same functions as the counterpart loop-side link receive module 40 described above in relation to the remote network unit 20. A port identifier associated with the cell data is also extracted by the distribution-side link receive module 86 for purposes of upstream cell routing, as described more fully below. As is the case with the loop-side link receive module 40 which was previously described, non-errored and non-idled cells are thereafter transferred from the distribution-side link receive module 86 for further processing. These non-errored and non-idled cells are forwarded to a distribution-side demultiplexer module 120, which manages upstream cell flow for the distribution network unit 10. Preferably, the distribution-side demultiplexer module 120 does not provide any back pressure indication to the distribution-side serializer-deserializer interface 84. This requires the distribution-side demultiplexer module 120 to be capable of accepting back-to-back cells transmitted at the full rate of the transmission link 36.

The distribution-side demultiplexer module 120 routes received and restructured downstream cells that are transmitted from the distribution-side link receive module 86. The cells are routed as at block 110 to one of a number of destinations, based on the port identifier extracted as previously described. Where the port identifier of a cell is indicative of test traffic, the cell is routed via block 110 to a first distribution-side test traffic monitor (TTM) 112. When enabled, the distribution-side test traffic monitor 112 performs supervision of any background test cells received in the upstream bound direction from the remote network unit 20 over transmission link 36. The monitored background test traffic is terminated at the distribution-side test traffic monitor 112 and is not forwarded by the distribution-side demultiplexer module 120 in the direction of outgoing distribution-side queues 118.

Should the port identifier in question be indicative of a control cell, the cell is routed by the distribution-side demultiplexer module 120 via block 110 to a distribution-side control cell queue 114, which may be implemented as first-in first-out (FIFO) registers. Where the distribution-side control cell queue 114 overflows, the control cell being directed thereto will be dropped and an overflow indication may be provided by the distribution-side demultiplexer module 120 to the distribution-side controller unit 98. The distribution-side control cell queue 114 in turn supplies control cells to a control cell receiving unit 152 of distribution-side controller unit 98 which for instance performs AAL5 functions as well known to those in this art.

If a port identifier is indicative of a user data cell, the cell in question is routed by the distribution-side demultiplexer module 120 in the upstream bound direction as at 116 to an outgoing distribution-side queue 118 via block 117. Where more (not shown) than one traffic processor 94 is deployed as described above, a plurality of corresponding outgoing distribution-side queues 118 may be provisioned, each of the outgoing distribution-side queues 118 being dedicated to a given traffic processor 94. In the example introduced above where eight (8) traffic processors 94 are utilized in the distribution network unit 10 to handle traffic in respect of ninety-six (96) ADSL ports of the remote network unit 20, eight (8) corresponding outgoing distribution-side queues 118 may be provided in the distribution network unit 10. Where any outgoing distribution-side queue 118 overflows, the cell in question is dropped and an indication of same is provided to the distribution-side controller unit 98. From the outgoing distribution-side queues 118, user data cell traffic is next directed in the upstream bound direction to the distribution-side interface 124. From there the user data cell traffic is directed to a corresponding traffic processor 94 via a respective bidirectional link 126 which, in the illustrative embodiment, is Utopia Level 2 compliant.

Cells received from the distribution-side link receive module 86, and not having a port identifier falling within one of the categories of test traffic cells, user data cells or control cells as described above, are dropped from the distribution-side demultiplexer module 120. An indication of same may then be provided to the distribution-side controller unit 98.

In the downstream bound direction, cell traffic received by the distribution-side multiplexer/demultiplexer unit 96 over the bidirectional links 126 are transmitted via distribution-side interface 124 to incoming distribution-side queues 128. The incoming distribution-side queues 128 may be provisioned as first-in first-out (FIFO) registers, with a queue corresponding to each of the bidirectional links 126. The queued cells from the incoming downstream queues 128 are forwarded via block 130 of the distribution-side multiplexer module 122 to one of a plurality of outgoing distribution-side queues 132. The outgoing distribution-side queues 132 may also be provisioned as first-in first-out (FIFO) registers, with each one of the outgoing distribution-side queues 132 corresponding to an external user data port of the remote network unit 20. Thus, in the example introduced above where the remote network unit 20 is provisioned with ninety-six (96) ADSL ports, a corresponding plurality of outgoing distribution-side queues 132 will be provided in the distribution network unit with a one-to-one mapping to each such port.

Servicing block 134 of the distribution-side multiplexer module 122 is located downstream of the outgoing distribution-side queues 132. The servicing block 134 forwards cells to block 138 from each of the outgoing distribution-side queues 132, from a distribution-side test traffic generator (TTG) 144 and from a distribution-side control cell queue 136. The distribution-side test traffic generator 144 is for downstream transmission of test cells. The downstream control cell queue 136 may for instance receive AAL5 control cells transmitted as at 146 from a cell generator 148 of the distribution-side controller unit 98. At block 138, user data cells, test cells and control cells that have been transmitted by servicing block 134 as mentioned above are forwarded to a distribution-side output queue 140 for subsequent downstream forwarding onto transmission 36 via a distribution-side link transmit module 142. The distribution-side output queue 140 may be provisioned as first-in first-out (FIFO) registers. The distribution-side link transmit module 142 of the distribution network unit 10 performs the same functions as the counterpart loop-side link transmit module 68 of the remote network unit 20. A traffic scheduling scheme governing servicing cells by block 134 is applied by traffic shaping unit 100, as described in greater detail below.

A second distribution-side test traffic monitor (TTM) 150 may be used to validate test traffic received by the distribution-side multiplexer module 122 from the traffic processors 94 over the distribution-side interface 124. When enabled, the second distribution-side test traffic monitor 150 functions to supervise any background test traffic via block 138. The monitored background test traffic is terminated at the second distribution-side test traffic monitor 150 and is not forwarded by the distribution-side multiplexer module 122 in the direction of distribution-side output queue 140.

As introduced above, the traffic shaping unit 100 performs traffic scheduling in respect of the downstream bound cell flow from the distribution-side multiplexer module 122 over transmission link 36. In FIG. 5, the traffic shaping unit or shaping module 100 is shown applying a traffic shaping signal to the servicing block 134. As the servicing block 134 forwards cells to block 138 from each of the outgoing downstream queues 132, the traffic shaping unit 100 may be used to effectively control rates at which downstream cell traffic passes through the servicing block 134.

For instance, the traffic shaping unit 100 may be provisioned to schedule traffic for each of the user data ports of the remote network unit 20, for the distribution-side control cell queue 136 and for the distribution-side test traffic generator 144. Thus, it will be appreciated that the traffic shaping unit 100 may be used to set the rate of downstream traffic at the distribution network unit 10 if the rate of traffic that can be handled by the downstream destination (i.e. the remote user terminals or data ports 32) is known.

By way of example, traffic shaping unit 100 may ensure that the rate of the downstream user cell data traffic, on a per user data port basis, does not exceed the train rate of the corresponding user data ports of remote network unit 20, thereby eliminating a bottleneck of traffic at remote network unit 20. If such a bottleneck occurred, this may cause remote network unit 20 to generate backpressure signals to distribution network unit 10. Such backpressure signals would indicate that distribution network unit 10 should moderate or halt transmission of traffic to that remote network unit 20. The traffic shaping unit 100 may also perform a suitable scheduling scheme in respect of the outgoing distribution-side queues 132, for instance one based on a work-conserving round robin algorithm or the like as known to those versed in this art. Preferably, the traffic shaping unit 100 may be programmable so as to accommodate predetermined or selectable scheduling schemes for the downstream bound cell flow.

That is to say, given the train rate of each user data port of each CPE 32 obtained from the xDSL chipset in the remote network unit 20, the traffic shaping unit 100 may be configured or programmed to effectively control the rate of downstream user cell data traffic for each specific user data port. The train rate of each user data port may be dependent upon factors such as, for example, the distance of the CPE 32 from the remote network unit 20, the quality of the line connecting the CPE 32 to the remote network unit 20, the actual physical device comprising the CPE 32, and the level of service the user has subscribed to. Thus, the train rates for two users may be different, even though the physical attributes of their individual data ports may otherwise be the same. These train rates for each user data port connected to the remote network unit 20 are preferably readily accessible to the traffic shaping unit 100 and may be stored, for example, in a memory 101 in the traffic shaping unit 100. However, it will be appreciated that the memory 101 may be located in any suitable location accessible by traffic shaping unit 100.

Each of servicing block 134 and traffic shaping unit 100 may comprise a collection of hardware, firmware and software elements (not shown) which collectively operate to control release of cells at rates compatible with train rates of respective downstream user data ports.

Operative elements of traffic shaping unit 100 generate its traffic control signal by embodying scheduling protocols known in the art in combination with the train rate information of the downstream user ports. As noted above, operative elements of traffic shaping unit 100 may embody a queue scheduling regime, such as a weighted fair queue (WFQ), priority queue, or other regimes known in the art. Further, hybrids of known regimes may also be used. Also, a per port scheduler (not shown) may be incorporated into traffic shaping unit 100 to feed traffic information to the queue scheduling regime, using train rates stored in memory 101.

Knowledge of the train rates for each individual user data port is then used by the traffic shaping unit 100 to locally control the flow of downstream cell traffic which would otherwise have to be determined by using flow control signals generated remotely by a remote device or node such as the user data port. Thus, the traffic shaping unit 100 effectively limits the downstream traffic flow directed to a particular user data port to a bandwidth that is less than or equal to the train rate for that port. Such information may be provided to traffic shaper unit by encoding such information in messages sent from the remote network units 20 to the distribution network unit 10 over established communication links which is then received and extracted by distribution network unit 10 and stored in memory 101. Alternatively, such information may be static and may be provided in a memory 101 in distribution network unit 10.

In operation, back pressuring of the downstream traffic flow scheduled at the traffic shaper module 100 will occur only when the distribution network 6 has a backlog of cells to be sent to a particular user data port and the distribution-side multiplexer 122 does not have enough space available in its corresponding incoming FIFO queue 128 to hold the additional cells. In such a case, the back pressuring is engaged by setting a flag (not shown) on the particular FIFO queue 128 corresponding to that port. When the flag is set, that FIFO queue 128 is effectively back pressured. Cells continue to be removed from that particular FIFO at a rate not exceeding that programmed by the traffic shaping unit 100. Thus, since the traffic shaping unit 100 controls the rate at which cells are removed from the queues 128, the traffic shaping unit 100 indirectly controls the back pressure signaling.

Advantageously, generating the flow control at the distribution-side reduces or eliminates the problem of latency associated with passing flow control signals back and forth across several kilometers or more, as is required in the prior art end-to-end flow control described earlier. Furthermore, by providing a local flow control and back pressuring mechanism at distribution network unit 10, the need for additional buffering or system considerations is reduced or eliminated.

While the above description describes controlling train rates of cell traffic in a downstream direction from distribution network unit 10 to remote network unit 20, in other embodiments, train rates may be controlled for cell traffic traversing in an upstream direction between devices.

Further, while the above description describes controlling train rates of cell traffic in xDSL communication systems, in other embodiments train rates may be controlled for other data communication protocols.

The distribution-side multiplexer/demultiplexer unit 29 (FIG. 2), distribution-side controller unit 27 (FIG. 2) and traffic shaping unit 100 (FIG. 4) of the distribution network unit 10 as previously described may together be implemented by means of a field programmable gate array or other suitable device as known to those in this field of art.

It is noted that those skilled in the art will appreciate that various modifications of detail may be made to the present embodiment, all of which would come within the scope of the invention.

We claim:

1. A system for establishing a data transmission rate in a telephony communication network for data transmission from a distribution network in a central office (CO), said distribution network including a first communication module coupled to a remote network unit including a second communication module, said second communication module being connected to the distribution network by a high-capacity transmission link, and said second communication module comprising digital subscriber link (DSL) ports connected via at least one local loop to a plurality of user terminals, the system comprising:

a first storage device for storing a predetermined rate limit for transmission of data by the second communication module, the first storage device being associated with the first communication module;

a traffic shaping unit at the first communication module for establishing a first module data transmission rate in dependence upon the predetermined rate limit to enable the second communication module to transmit data therefrom within the predetermined rate limit;

a second storage device associated with the second communication module for storing the predetermined rate limit;

a communication submodule in the second communication module to extract the predetermined rate limit from the second storage device and transmit the predetermined rate limit to the first communication module, wherein said predetermined rate limit for transmission of data by the second communication module, which is stored in the first storage device associated with the first communication module, is based on at least one of transmission rates of said DSL ports in said second communication module and transmission rates of said user terminals, and wherein the predetermined rate limit is dependent upon factors including distances of the user terminals from the remote network unit, transmission rates of DSL devices in the user terminals, and levels of service subscribed to by users of the user terminals.

2. The system recited in claim 1, wherein the first communication module is configured to receive from the distribution network data directed to the second communication module, and the first communication module includes, at an interface to the distribution network, a data buffer for buffering the data directed to the second communication module.

3. The system recited in claim 2, wherein the predetermined rate limit is a rate at which the data directed to the second communication module is extracted from the data buffer by the traffic shaping unit.

4. The system recited in claim 2, wherein the data buffer at the interface is a FIFO queue and the traffic shaping unit is configured to back pressure at the FIFO queue any flow of data directed to the second communication module which exceeds the predetermined rate limit established by the traffic shaping unit.

5. The system recited in claim 1, wherein the predetermined rate limit comprises a train rate established for the DSL ports in said second communication module.

6. The system recited in claim 1, wherein the predetermined rate limit comprises a train rate of a data port in one of said user terminals to which said data is being transmitted from the distribution network to said one of said user terminals via said first communication module, said high-capacity transmission link, said second communication module, and said at least one local loop.

7. A system for establishing a data transmission rate in a telephony communication network from a first communication module to a second communication module, said second communication module being connected to the first communication module by a first transmission link, said second communication module being connected via at least one local loop to a plurality of user terminals, and said first transmission link having a higher data transmission capacity than said at least one local loop, the system comprising:
- a first storage device for storing a predetermined rate limit for transmission of data by the second communication module, the first storage device being associated with the first communication module;
- a traffic shaping unit at the first communication module for establishing a first module data transmission rate in dependence upon the predetermined rate limit to enable the second communication module to transmit data therefrom within the predetermined rate limit;
- a second storage device associated with the second communication module for storing the predetermined rate limit;
- a communication submodule in the second communication module to extract the predetermined rate limit from the second storage device and transmit the predetermined rate limit to the first communication module, wherein said predetermined rate limit for transmission of data by the second communication module, which is stored in the first storage device associated with the first communication module, is based on rates of data transmission between said second communication module and said user terminals, and wherein the predetermined rate limit is dependent upon factors including distances of the user terminals from the remote network unit, transmission rates of DSL devices in the user terminals, and levels of service subscribed to by users of the user terminals.

8. The system recited in claim 7, wherein the first communication module is configured to receive from a data distribution network data directed to the second communication module, and the first communication module includes, at an interface to the data distribution network, a data buffer for buffering the data directed to the second communication module.

9. The system recited in claim 8, wherein the predetermined rate limit is a rate at which the data directed to the second communication module is extracted from the data buffer by the traffic shaping unit.

10. The system recited in claim 9, wherein the data buffer at the interface is a FIFO queue and the traffic shaping unit is configured to back pressure at the FIFO queue any flow of data directed to the second communication module which exceeds the predetermined rate limit established by the traffic shaping unit.

11. The system recited in claim 9, wherein the predetermined rate limit comprises a train rate established for DSL ports in said second communication module.

* * * * *